United States Patent
Lin et al.

(10) Patent No.: US 12,420,882 B2
(45) Date of Patent: Sep. 23, 2025

(54) POWER-MEASURING DEVICES

(71) Applicant: GIANT MANUFACTURING CO., LTD., Taichung (TW)

(72) Inventors: Ching-Yao Lin, Taichung (TW); Chin-Lai Huang, Hsinchu (TW); Chih-Kai Chang, Taichung (TW); Chung-Wei Lin, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 277 days.

(21) Appl. No.: 18/058,744

(22) Filed: Nov. 24, 2022

(65) Prior Publication Data
US 2023/0174185 A1 Jun. 8, 2023

Related U.S. Application Data

(60) Provisional application No. 63/264,833, filed on Dec. 2, 2021.

(51) Int. Cl.
*B62J 45/411* (2020.01)
*B62J 45/421* (2020.01)

(52) U.S. Cl.
CPC ........... *B62J 45/411* (2020.02); *B62J 45/421* (2020.02)

(58) Field of Classification Search
CPC . B26J 45/40; B26J 45/41; B26J 45/411; B26J 45/42; B26J 45/421
See application file for complete search history.

(56) References Cited

U.S. PATENT DOCUMENTS

| | | | |
|---|---|---|---|
| 8,881,608 B2 * | 11/2014 | Tetsuka | B62M 3/00 73/862 |
| 10,000,249 B2 * | 6/2018 | Sasaki | B62M 1/36 |
| 11,001,327 B1 * | 5/2021 | Santurbane | B62J 45/414 |
| 11,738,825 B2 * | 8/2023 | Chen | B62M 3/083 74/594.4 |
| 11,794,849 B2 * | 10/2023 | Favero | B62J 45/421 |

FOREIGN PATENT DOCUMENTS

| | | | |
|---|---|---|---|
| EP | | 2299252 A1 | 3/2011 |
| FR | | 3078158 A1 | 8/2019 |
| TW | | 201607833 A | 3/2016 |
| TW | | 202129241 A | 8/2021 |
| WO | WO 2021028845 A1 | | 2/2021 |
| WO | WO 2021105951 A1 | | 6/2021 |
| WO | WO 2021234466 A1 | | 11/2021 |

* cited by examiner

*Primary Examiner* — Erika J. Villaluna
(74) *Attorney, Agent, or Firm* — Finnegan, Henderson, Farabow, Garrett & Dunner, L.L.P.

(57) ABSTRACT

A power-measuring device includes a spindle, a power gauge, an electrical circuit, and a cover. The spindle is configured to provide a coupling with a driving unit. The spindle includes a battery chamber within a hollow space of the spindle. The battery chamber is configured to receive a battery unit. The power gauge is coupled with the spindle to measure power applied to the spindle for driving a movement of the driving unit. The electrical circuit is coupled with the spindle, and electrically coupled with the power gauge. The electrical circuit is coupled with the battery unit and configured to receive and process signals from the power gauge. The cover is coupled with the spindle and arranged to enclose at least a portion of at least one of the power gauge and the electrical circuit.

20 Claims, 14 Drawing Sheets

POWER-MEASURING DEVICES

CROSS-REFERENCE TO RELATED APPLICATIONS

The present application claims priority to U.S. Provisional Application No. 63/264,833, filed on Dec. 2, 2021, which is incorporated herein by reference in its entirety.

TECHNICAL FIELD

The disclosure relates to bicycles and power-measuring devices for the bicycles.

BACKGROUND

A bicycle power-measuring device, also known as a power meter to some, is a device for measuring a rider's pedaling power during cycling. The pedaling power can be measured in the form of or converted or computed from the torque level a rider exerts in driving bike pedals and/or crank arms. For example, a bicycle power-measuring device can be one or more strain gauges in one or both cranks or within one of both pedals. A deformation of a measuring device or gauge varies according to the amount of force applied. The change in strain characteristic or deformation of the strain gauge can then be measured, processed, and/or converted to derive the pedaling torque.

However, a conventional bicycle power-measuring device needs various components that can take up a lot of space, which increases the overall size, weight, and/or placement of the power-measuring device. Furthermore, all the moving parts may be subject to water, physical impacts, dusts, mud, and/or weather conditions, which may impact the operability, accuracy, and reliability of the device.

SUMMARY

Consistent with some embodiments, a power-measuring device includes a spindle, a power gauge, an electrical circuit, and a cover. The spindle is configured to provide a coupling with a driving unit. The spindle includes a battery chamber within a hollow space of the spindle. The battery chamber is configured to receive a battery unit. The power gauge is coupled with the spindle to measure power applied to the spindle for driving a movement of the driving unit. The electrical circuit is electrically coupled with the power gauge. The electrical circuit is coupled with the battery and configured to receive and process signals from the power gauge. The cover is coupled with the spindle and arranged to enclose at least a portion of at least one of the power gauge and the electrical circuit.

Consistent with some embodiments, a bicycle includes crank arms configured to receive power from a rider, a driving unit configured to drive the bicycle through pedaling of the crank arms; and a power-measuring device. The power-measuring device includes a spindle, a power gauge, an electrical circuit, and a cover. The spindle is configured to provide a coupling with a driving unit. The spindle includes a battery chamber within a hollow space of the spindle. The battery chamber is configured to receive a battery unit. The power gauge is coupled with the spindle to measure power applied to the spindle for driving a movement of the driving unit. The electrical circuit is electrically coupled with the power gauge. The electrical circuit is coupled with the battery and configured to receive and process signals from the power gauge. The cover is coupled with the spindle and arranged to enclose at least a portion of at least one of the power gauge and the electrical circuit.

Consistent with some embodiments, a spindle includes: a first section having a first outer diameter, a second section having a second outer diameter smaller than the first outer diameter, a transition section coupled between the first section and the second section, and a battery chamber within a hollow space of the spindle, the battery chamber being configured to receive a battery unit. The battery chamber extends through at least a portion of the first section and at least a portion of the second section. The first section and the second section have similar inner diameters for providing the hollow space for the battery chamber within the spindle. A hole is provided on the spindle between the first section and the second section.

BRIEF DESCRIPTION OF THE DRAWINGS

The accompanying drawings, which are incorporated in and constitute a part of this specification, illustrate several exemplary embodiments and, together with the corresponding descriptions, provide examples for explaining the disclosed embodiment consistent with the present disclosure and related principles.

DETAILED DESCRIPTION

Reference will now be made in detail to exemplary embodiments, examples of which are illustrated in the accompanying drawings and disclosed herein. The implementations set forth in the following description of exemplary embodiments are examples of systems and methods consistent with the aspects related to the disclosure and consistent with those recited in the appended claims. However, the following descriptions should not and do not limit the scope of the present disclosure.

Figure 1A:
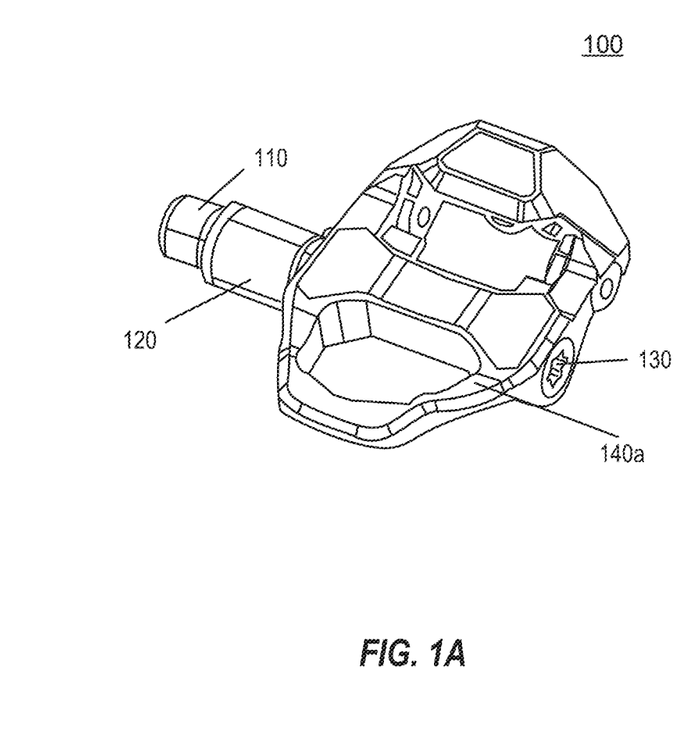
FIG. 1A and FIG. 1B illustrate exemplary power-measuring devices consistent with some embodiments of the present disclosure.
Figure 1B:
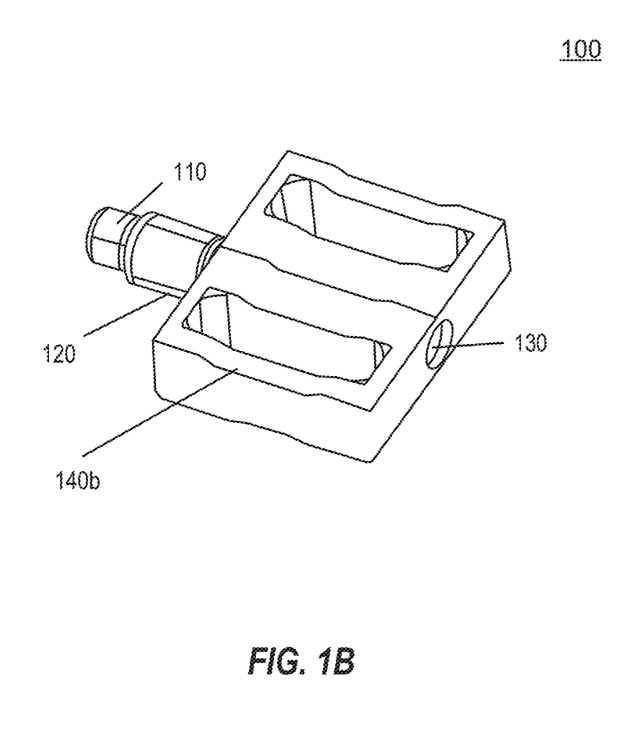

FIG. 1A and FIG. 1B are diagrams illustrating exemplary power-measuring devices 100 consistent with some embodiments of the present disclosure. As shown in FIG. 1A, the power-measuring device 100 includes a spindle 110, a spindle cover 120 coupled with the spindle 110, and at least an end cap 130 attached to one end of the spindle 110. In some embodiments, the power-measuring device 100 may be coupled with a removable pedal (e.g., a pedal body 140a for cycling shoes with cleats) for cycling that is coupled with the spindle 110, and one or more pedal designs may be available. In some other embodiments, different users or cyclists may opt for different pedals, pedal designs, or pedal systems, such as those of different brands, those with different mechanical designs or structures, and those work with different cleats or cycling shoes. In the power-measuring device 100 shown in FIG. 1B, the power-measuring device 100 is coupled with a different pedal body 140b, such as a flat pedal that is not restricted to a particular type or brand of shoes or shoe cleats.

Figure 2A:
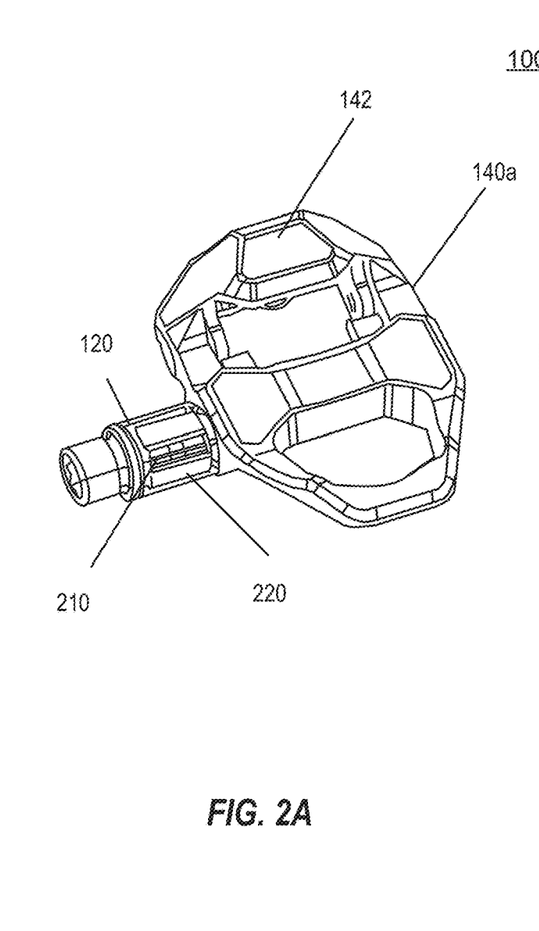
FIGS. 2A-2C illustrate various views of the exemplary power-measuring device consistent with some embodiments of the present disclosure.
Figure 2B:
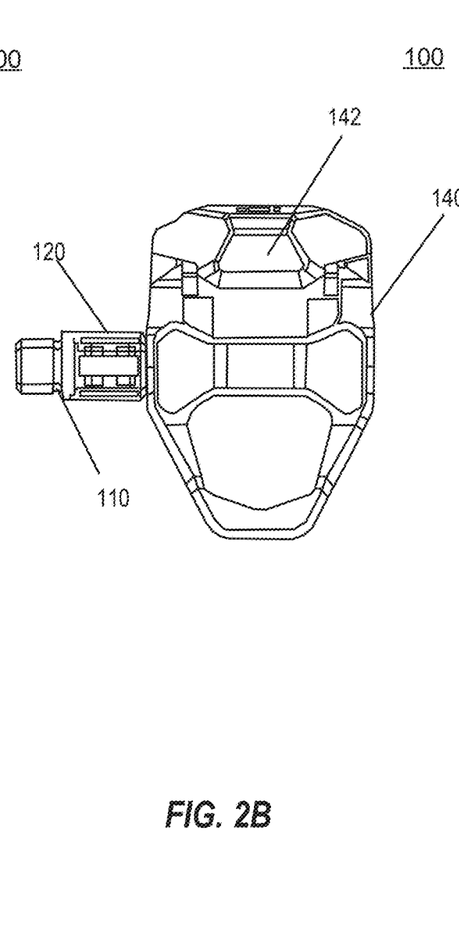
Figure 2C:
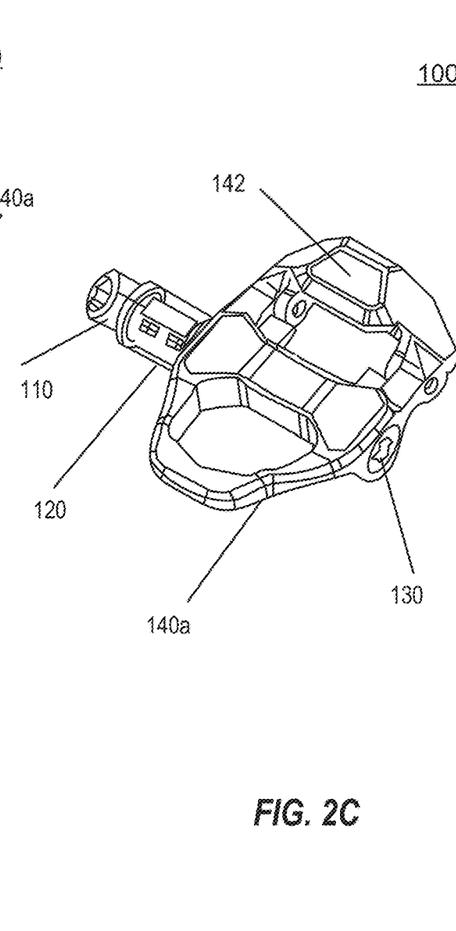

FIGS. 2A-2C are diagrams illustrating different perspective views of the exemplary power-measuring device 100 consistent with some embodiments of the present disclosure. In the power-measuring device 100 shown in FIGS. 2A-2C, the pedal body 140a includes a pedal plate 142, which can have one of various designs to work with shoes or shoe cleats of different brands, different mechanical designs or structures, or different riding conditions or applications. As shown in FIGS. 2A-2C, the spindle cover 120 is coupled with a portion of the spindle 110 and may be arranged to enclose at least a portion of one or more power gauges 210 (e.g., strain gauge) and/or an electrical circuit 220 electrically coupled with the power gauge 210. The electrical circuit 220 is coupled with the spindle 110 and electrically coupled with one or more battery units and configured to receive, process, read, or detect signals from the power gauge 210. In some embodiments, the electrical circuit 220 includes a printed circuit board (PCB) or a flexible printed circuit (FPC) enclosed in a protective material under the cover. The power gauge 210 is coupled with the spindle 110 to measure the power transferring from an exerted force applied by a rider to the spindle 110 during pedaling. As shown in FIG. 2C, the end cap 130 may provide a locking mechanism to prevent the pedal body 140a from coming loose from the spindle 110. In some embodiments, the pedal body 140a can be released from the spindle 110 only after the end cap 130 is removed.

Figure 3A:
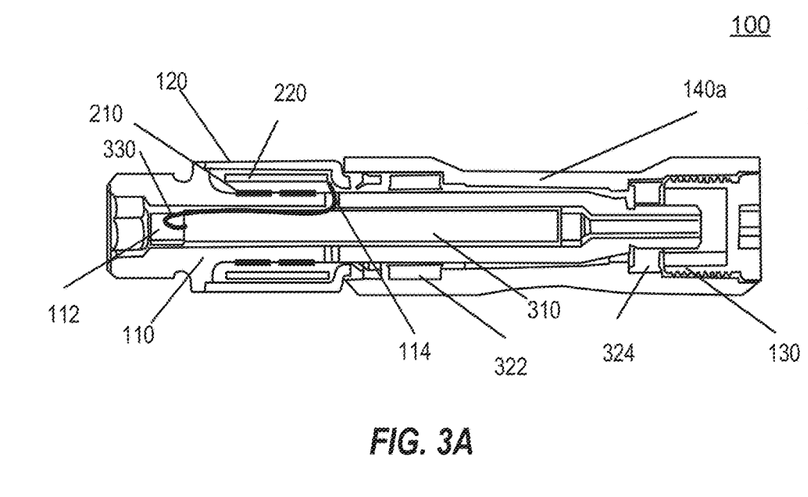
FIGS. 3A-3D illustrate cross-section views of an exemplary power-measuring device consistent with some embodiments of the present disclosure.
Figure 3B:
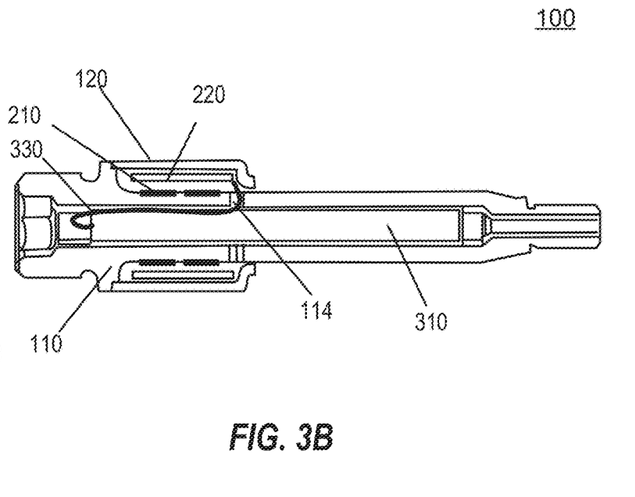
Figure 3C:
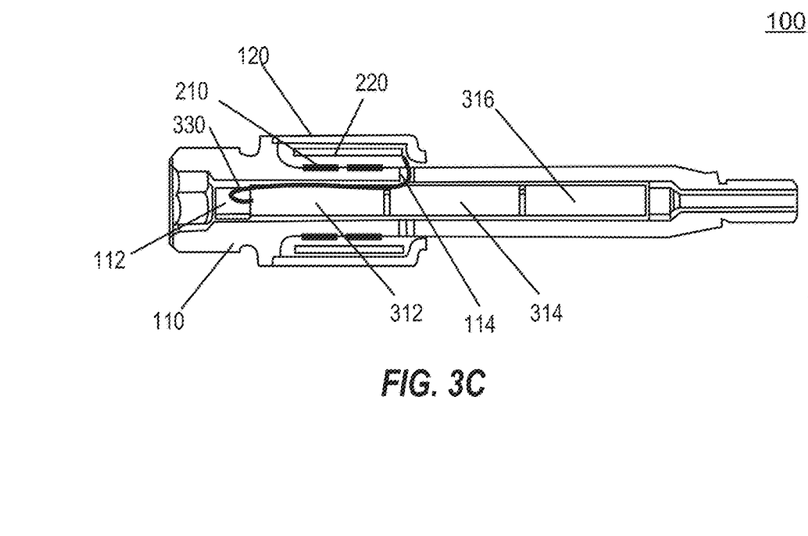
Figure 3D:
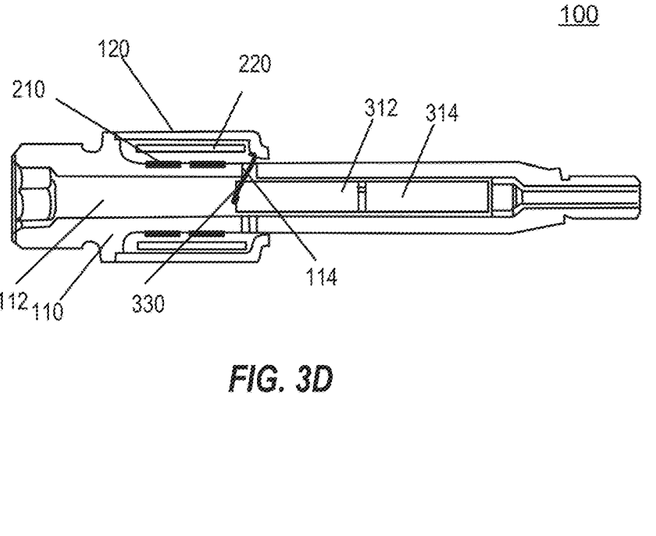

FIGS. 3A-3D are diagrams illustrating cross-section views of the exemplary power-measuring device 100 consistent with some embodiments of the present disclosure. As shown in FIGS. 3A-3D, the spindle 110 is configured to provide a coupling with a driving unit. For example, the driving unit may drive a bicycle, through pedaling of bicycle crank arms that are configured to receive power from a rider. The spindle 110 includes a battery chamber 112 within a hollow space of the spindle 110. The battery chamber 112 is configured to receive one or more battery units 310. The spindle cover 120 encloses at least a portion of at least one or more power gauges 210 and the PCB/FPC circuit 220. The PCB/FPC circuit 220 is coupled with one or more battery units 310 in the battery chamber 112. One or more bearing units 322, 324 may be mounted on, near, or within the spindle 110. The pedal body 140a or 140b may be coupled with the spindle 110 and the end cap 130 is attached to the pedal body 140a or 140b at one end of the spindle 110, to the spindle 110, or to both the spindle 110 and pedal body 140a or 140b. In some embodiments, the battery chamber 112 is configured to enclose a single battery unit 310. In some embodiments, as shown in FIGS. 3C and 3D, the battery chamber 112 is configured to enclose multiple battery units 312, 314, 316 coupled in series or in parallel. For example, the battery units 312, 314, 316 may include a plurality of button batteries or pin-type batteries connected in series or in parallel. The term "pin-type battery" or "pin-shaped battery" as used herein refers to a battery having a slim and cylindrical shape. In some embodiments, the battery may be a rechargeable battery, such as a Lithium-ion (Li-Ion) battery. In some other embodiments, prismatic Li-Ion battery cells or pouch Li-Ion battery cells (soft pack) may also be used if the size of the battery cell is sufficiently small to fit into the battery chamber 112.

The electrodes of the battery unit(s) are electrically coupled to the electrical circuit 220 via wiring, via spindle itself, or via both. And a set of wires 330 may pass through a hole 114 provided on the spindle 110 to couple the battery's electrodes to the electrical circuit 220. The electrical circuit 220 can be powered at least in part by the battery unit 310. The electrical circuit 220 may also be powered by the relative rotational movement between the spindle 110 and the pedal body 140a or 140b, by solar, or by a combination or alternation among two or more different kinds of power sources.

In various embodiments, arranging the battery unit 310 within a cylindrical space (e.g., battery chamber 112) inside the spindle 110 may significantly reduce the overall size of the power-measuring device 100, reducing the cost and/or providing a compact or streamlined design. In some embodiments, this design also brings more flexibility to the arrangement of power gauges 210 and the electrical circuit 220 enclosed in the spindle cover 120, because the battery unit 310 does not take up much space. In addition, protecting the battery unit 310 with the spindle 110 may prevent dust, water, grease, collision, and other concerns. Furthermore, larger battery components can be used without occupying additional space, which improves the device performance (e.g., longer time for cycling) and the user experience.

Figure 4A:
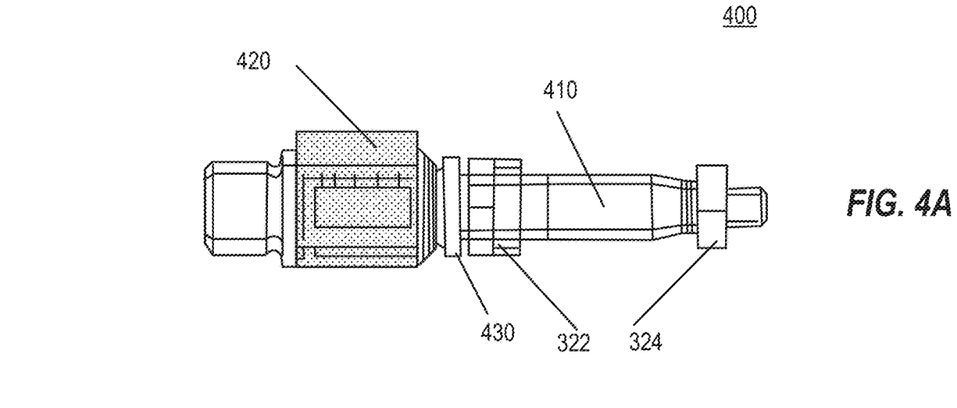
FIGS. 4A-4C illustrate cross-section views of another exemplary power-measuring device consistent with some other embodiments of the present disclosure.
Figure 4B:
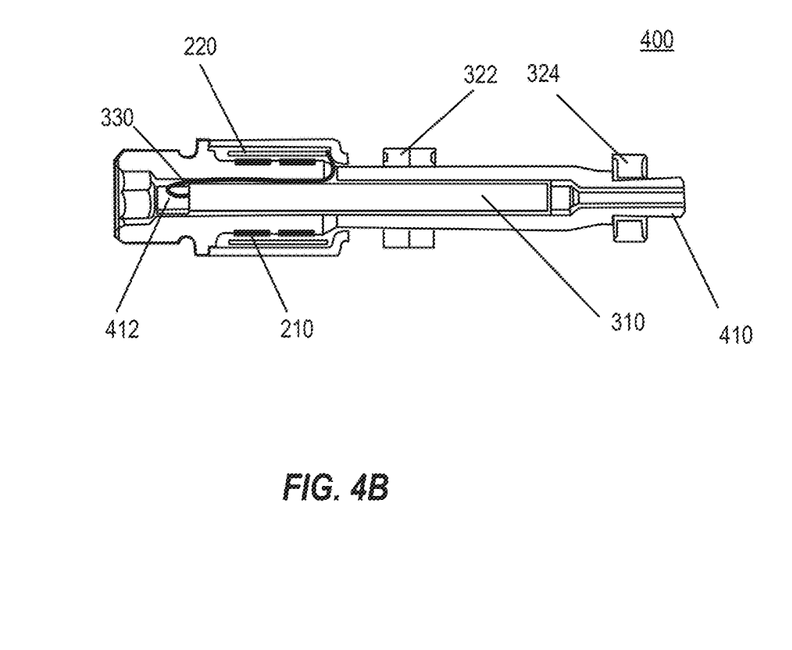
Figure 4C:
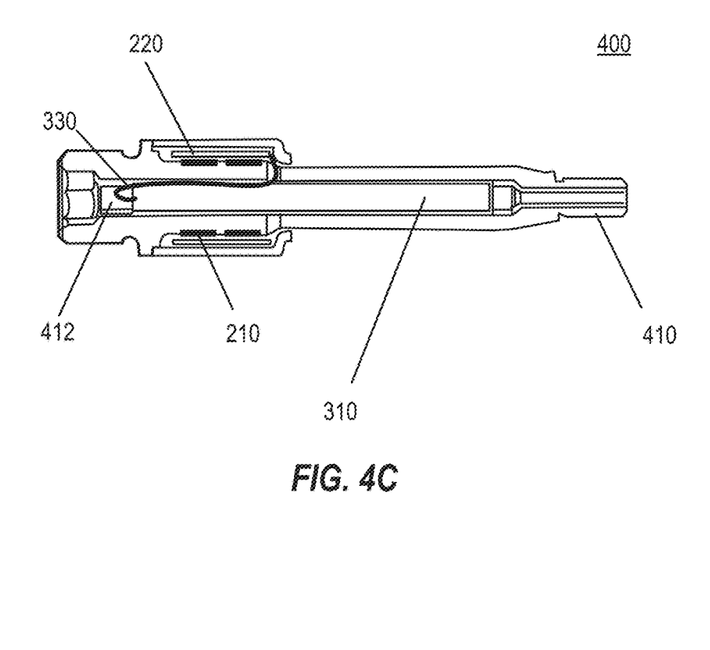
Figures 5A, 5B, 5C:
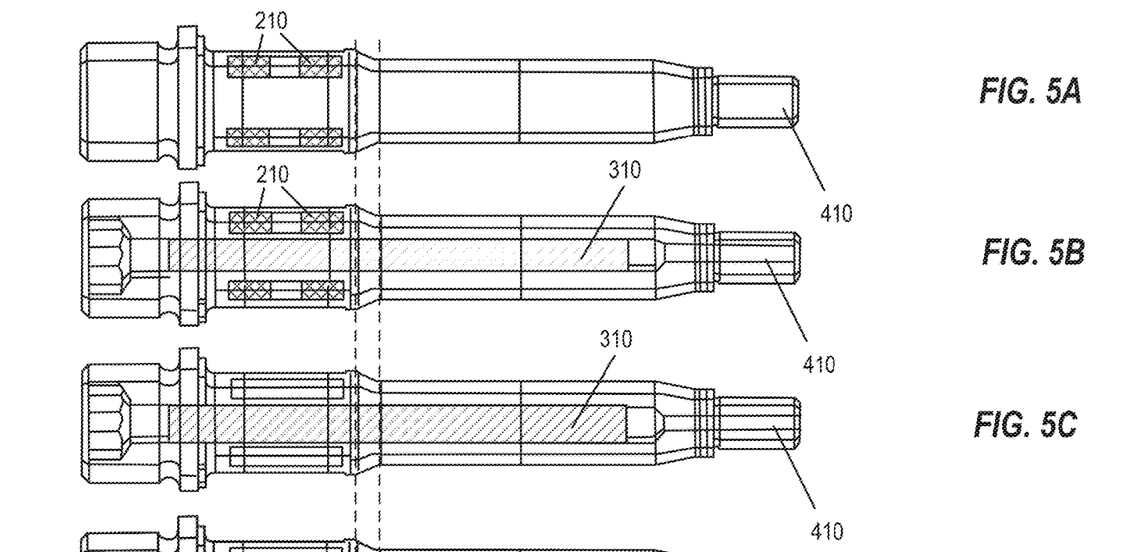
FIGS. 5A-5E illustrate cross sectional views of the power-measuring device of FIGS. 4A-4C, consistent with some embodiments of the present disclosure.
Figures 5D, 5E:
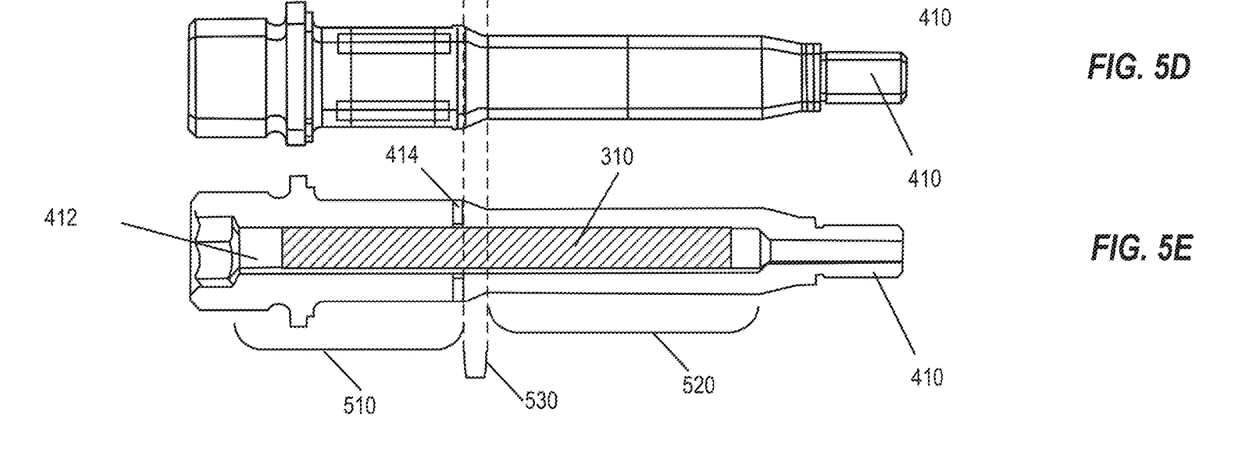

FIGS. 4A-4C are diagrams illustrating cross-section views of another exemplary power-measuring device 400 consistent with some other embodiments of the present disclosure. Similar to FIGS. 3A-3D, the spindle 410 includes a battery chamber 412 for one or more battery units 310. The spindle cover 420 encloses at least a portion of one or more power gauges 210 and the PCB/FPC circuit 220. The PCB/FPC circuit 220 is electrically coupled with one or more battery units 310 in the battery chamber 412. One or more bearing units 322, 324 are mounted on the spindle 410. The pedal body (not shown) is coupled with the spindle 410 and the end cap (not shown) is attached to the pedal body at one end of the spindle 410, to the spindle 410, or to both. In some embodiments, the battery chamber 412 is configured to store a single battery. In some embodiments, the battery chamber 412 is configured to store multiple batteries coupled in series or in parallel. In some embodiments, the power-measuring device 400 also includes a sealing ring 430 arranged adjacent to the spindle cover 420 and configured to prevent water or dust from damaging the one or more power gauges 210 and/or PCB/FPC circuit 220 enclosed in the spindle cover 420.

FIGS. 3A-3D and FIGS. 4A-4C show two different types of the spindle 110 and 410. In the embodiments of FIGS. 4A-4C and FIGS. 5A-5E, the spindle 410 includes a first section 510 having a first outer diameter and a second section 520 having a second outer diameter, in which the second outer diameter is smaller than the first outer diameter. The battery chamber 412 extends through at least a portion of the first section 510 and at least a portion of the second section 520. The first and the second sections 510, 520 having similar inner diameters for providing the hollow space for the battery chamber 412 within the spindle 410. As shown in FIGS. 4A-4C, the power gauge 210 is mounted on or near the first section 510 of the spindle 410, and the spindle cover 420 is arranged to cover at least an area of the first section 510. The one or more bearing units 322, 324 are arranged on the second section 520.

As shown in FIGS. 4A-4C and FIGS. 5A-5E, a hole 414 is provided on the spindle 410 between the first section 510 and the second section 520, and a transition section 530 couples between the first section 510 and the second section 520. Particularly, the hole 414 is provided on the spindle 410 in the first section 510 with the greater outer diameter.

In some embodiments, the spindle 410 having two sections 510, 520 with different outer diameters can provide a structure distributing the stress evenly to withstand greater stress on the spindle 410 during the pedaling and prevent the spindle 410 from damages by the high stress distributed in an area near and/or around the hole 414 provided within the spindle 410 for the wiring.

Figure 6:
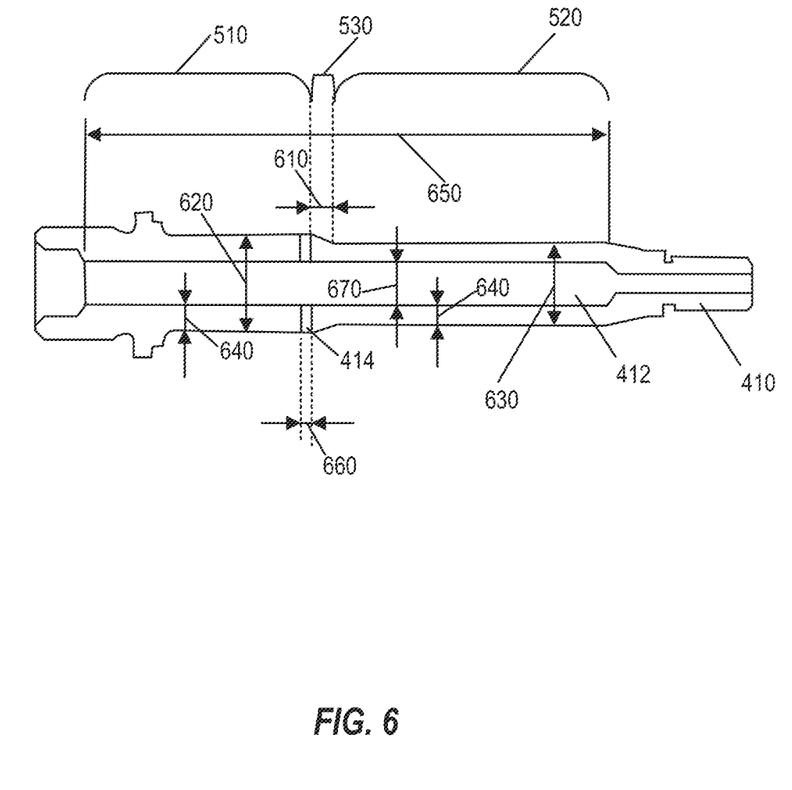
FIG. 6 illustrates a cross sectional view of the power-measuring device of FIGS. 4A-4C, consistent with some embodiments of the present disclosure.

As shown in FIG. 6, in some embodiments, a length 610 of the transition section 530 along a longitudinal axis of the spindle 410 between approximately 1 and 6 millimeters. For example, the length 610 of the transition section may be 1, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, or 6.0 mm, or any other practical number according to the actual design needs. In some embodiments, the transition section 530 may have a surface with a straight slope (e.g., as shown in FIG. 6) or with a curve, such as a convex, a concave, or another shape with varying heights along the length of the section.

As shown in FIG. 6, in some embodiments, the first outer diameter 620 of the first section 510 is approximately between 11-15 millimeters (e.g., 11, 11.5, 12, 12.5, 13, 13.5, 14, 14.5, or 15 mm, or any other practical number according to the actual design needs).

As shown in FIG. 6, in some embodiments, the second outer diameter 630 of the second section 520 is between approximately 10 and 13 millimeters (e.g., 10, 10.5, 11, 11.5, 12, 12.5, or 13 mm, or any other practical number according to the actual design needs).

As shown in FIG. 6, in some embodiments, a thickness 640 of a spindle wall surrounding the battery chamber 412 is between approximately 2 and 4 millimeters (e.g., 2, 2.2, 2.4, 2.6, 2.8, 3, 3.2, 3.4, 3.6, 3.8, or 4 mm, or any other practical number according to the actual design needs).

As shown in FIG. 6, in some embodiments, a length 650 of the battery chamber 412 is between approximately 50 and 80 millimeters (e.g., 50, 55, 60, 65, 70, 75, or 80 mm, or any other practical number according to the actual design needs).

As shown in FIG. 6, in some embodiments, a diameter 660 of the hole 414 through the spindle wall in the spindle 410 is between approximately 0.6 and 3 millimeters (e.g., 0.6, 0.8, 1.0, 1.2, 1.4, 1.6, 1.8, 2.0, 2.2, 2.4, 2.6, 2.8 or 3.0 mm, or any other practical number according to the actual design needs).

As shown in FIG. 6, in some embodiments, a diameter 670 of the battery chamber 412 is between approximately 4.5 and 9 millimeters (e.g., 4.5, 5, 5.5, 6, 6.5, 7, 7.5, 8, 8.5, or 9 mm, or any other practical number according to the actual design needs).

Figure 7A:
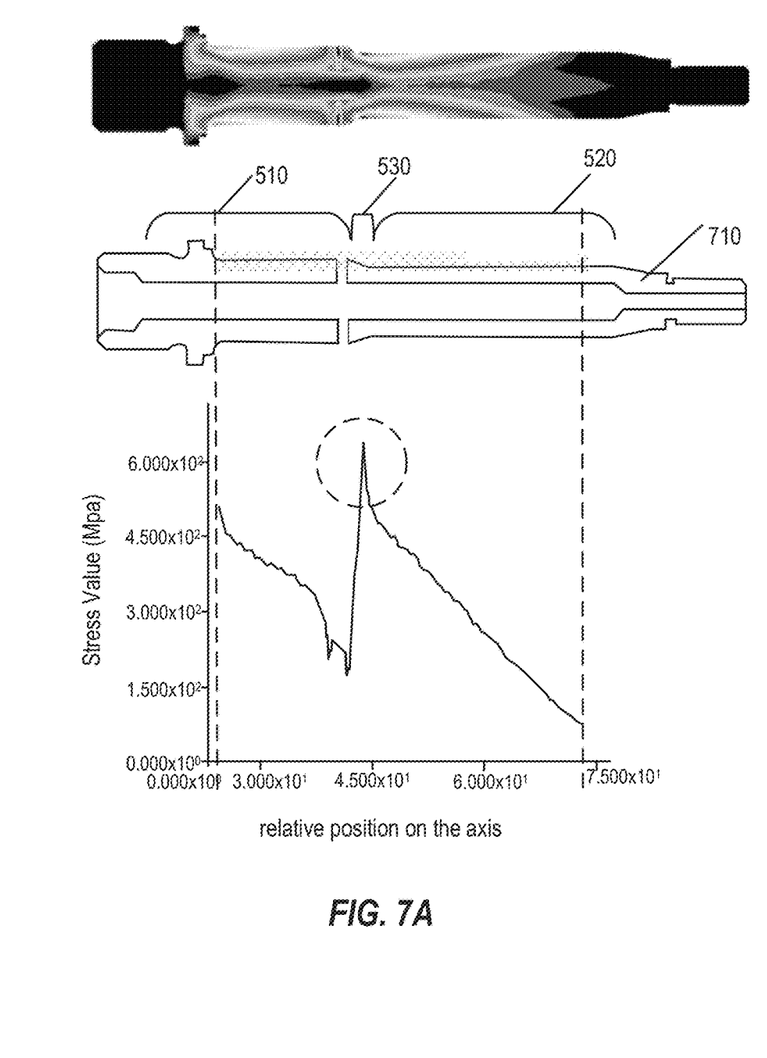
FIGS. 7A and 7B illustrate examples of stress distributions of two spindle designs consistent with some embodiments of the present disclosure.
Figure 7B:
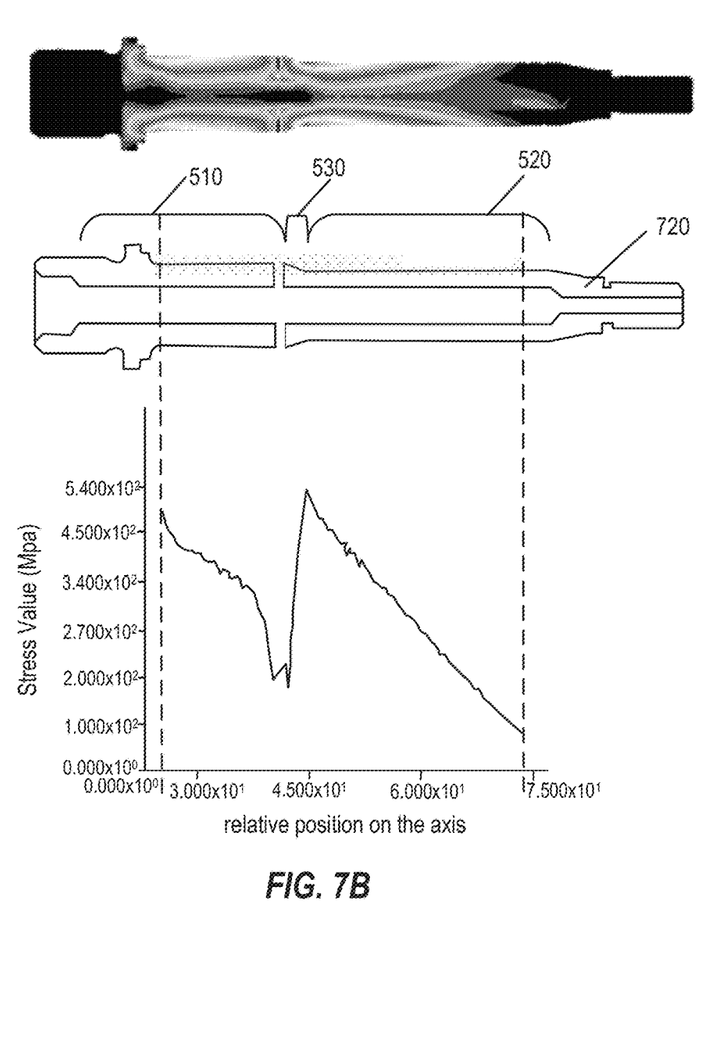
Figure 8:
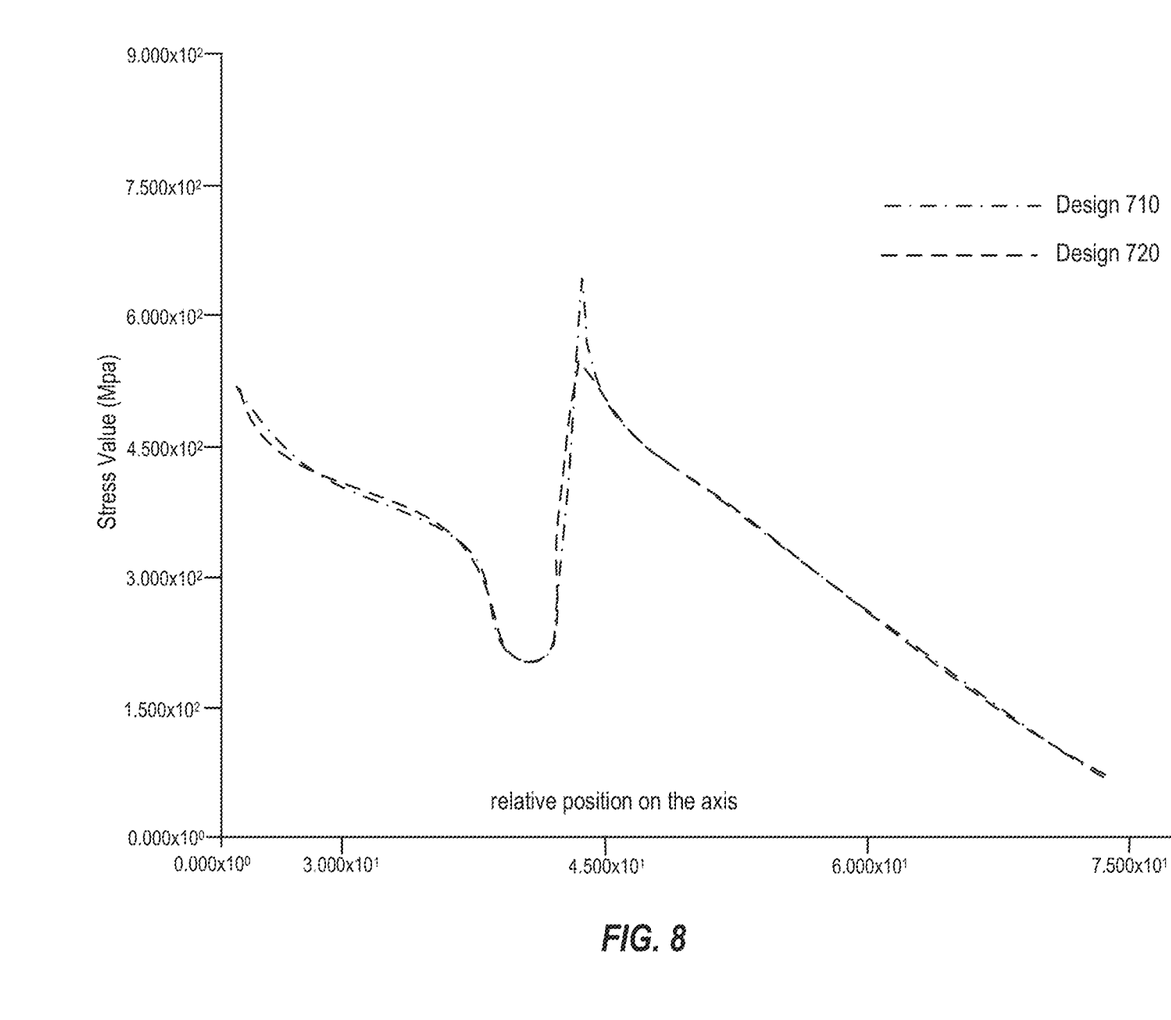
FIG. 8 illustrates a comparison between stress values of two exemplary designs consistent with some embodiments of the present disclosure.

FIGS. 7A and 7B illustrate stress distributions of two spindle designs (e.g., design 710 and design 720) with different parameters, consistent with some embodiments of the present disclosure. FIG. 8 illustrates a comparison between stress values of design 710 and of design 720, consistent with some embodiments of the present disclosure. As shown in FIGS. 7A and 7B, the transition section 530 between the first section 510 and the second section 520 in design 710 is steeper (e.g., with a greater slope value) compared to the design 720. As discussed in FIG. 6 above, the length 610 of the transition section 530 may be selected to be within approximately 1-6 millimeters to adjust the slope value of the transition section 530 within a proper range to reduce the stress applied to the transition section 530. Particularly, the transition section 530 with a greater length 610 may provide a lower slope value, thereby reducing the maximum stress value that occurs around the structure of the transition section 530 and next to the hole. As shown in FIGS. 7A and 7B, the peak of the stress value in design 720 is significantly lower than the peak of the stress value in design 710, which indicates that the stress withstanding ability of the spindle 410 can be further improved by properly adjusting the slope value of the transition section 530, even if the spindle 410 is designed to have the hollow space for the battery chamber 412. In one example, the maximum stress value of design 710 is around 646 MPa in a test, which occurs at or near the connecting point between the transition section 530 and the second section 520. On the other hand, the transition section 530 of the design 720 is a milder slope, and the maximum stress value of design 720 is around 548 MPa under the same test condition.

Because the slope of the transition section 530 can be determined based on parameter values including the first outer diameter 620, the second outer diameter 630, and the length 610 of the transition section 530, in some embodiments, the selection of the second outer diameter 630 is associated with the selection of the first outer diameter 620, to ensure the difference between the first outer diameter 620 and the second outer diameter 630 is within a threshold value, e.g., around or within 2 mm. Alternatively, the selection of the length 610 of the transition section 530 is associated with the difference between the first outer diameter 620 and the second outer diameter 630. In some embodiments, the slope of the transition section 530 may be in the range of about 0° to 45° (e.g., 0°, 5°, 10°, 15°, 20°, 25°, 30°, 35°, 40°, 45°, or any other angle based on design needs or design choices). For example, the first outer diameter 620 of 15 mm, the second outer diameter 630 of 13 mm, and the length 610 of 1 mm may provide a 45-degree slope. The slope of 0° indicates that the first section 510 at one side of the hole (e.g., hole 114 or hole 414) and the second section 520 at the other side of the hole have the same outer diameter without a sloped transition section (e.g., as shown in the design of the power-measuring device 100 in FIGS. 3A-3D). By designing a relatively mild transition section 530, the spindle 410 may be designed with desired mechanical properties, strengths, or shapes. In other words, a selection or variation of these parameter values can adjust the mechanical force or repetitive loading spindle 410 can withstand and vary its ability to prevent force/load-induced damages.

Figure 9A:
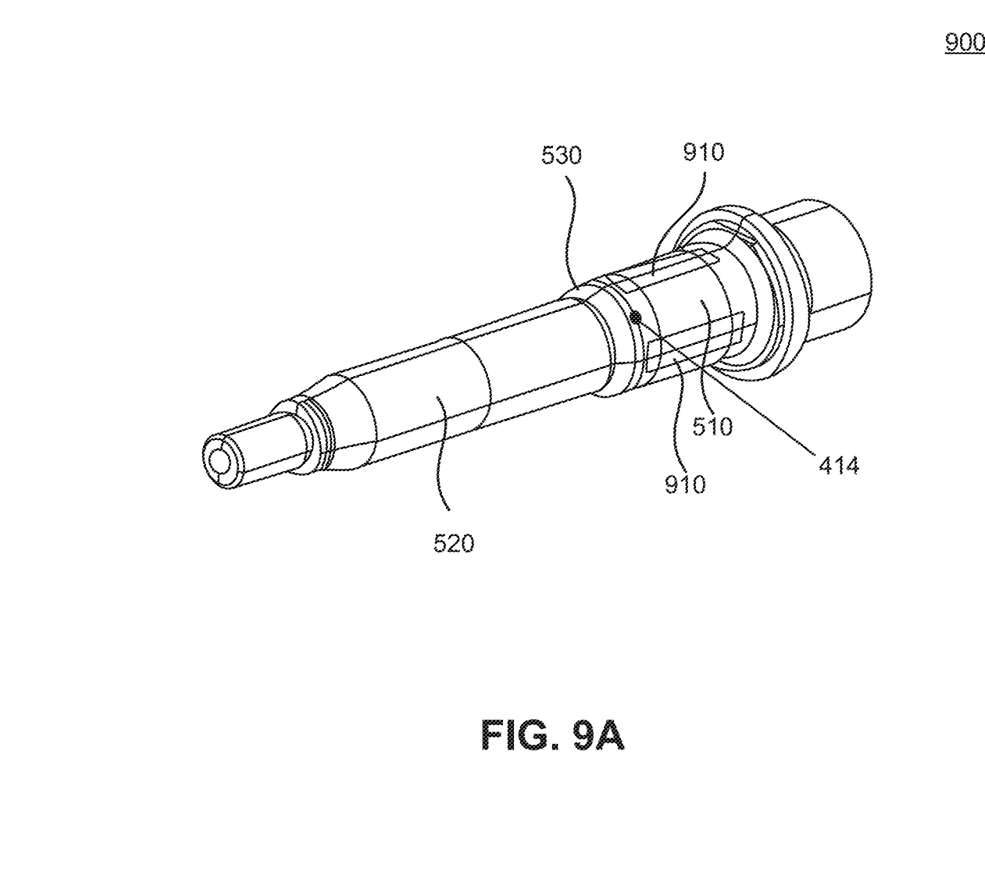
FIGS. 9A-9C illustrate another exemplary power-measuring device, consistent with some embodiments of the present disclosure.
Figure 9B:
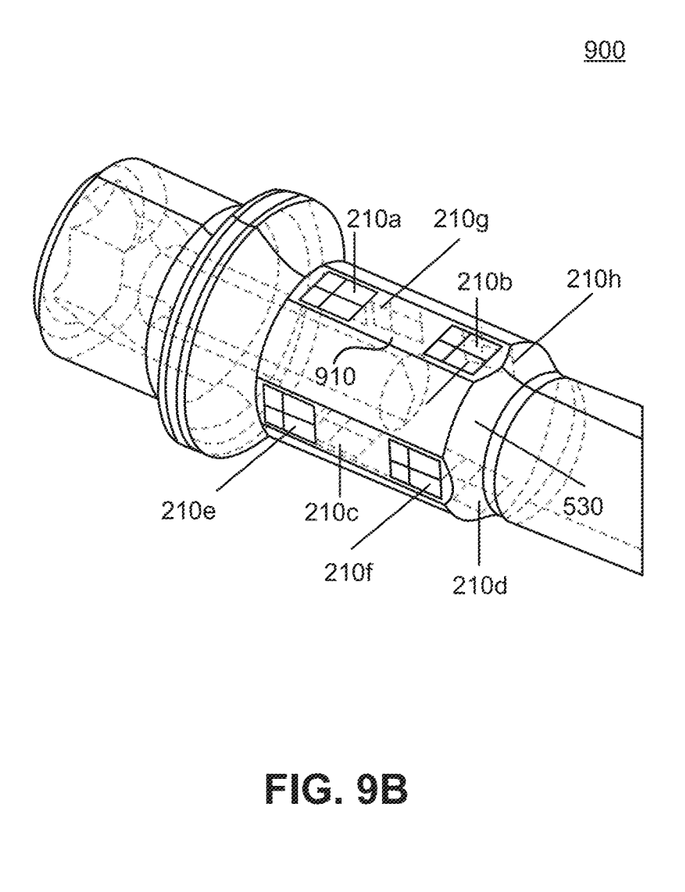
Figure 9C:
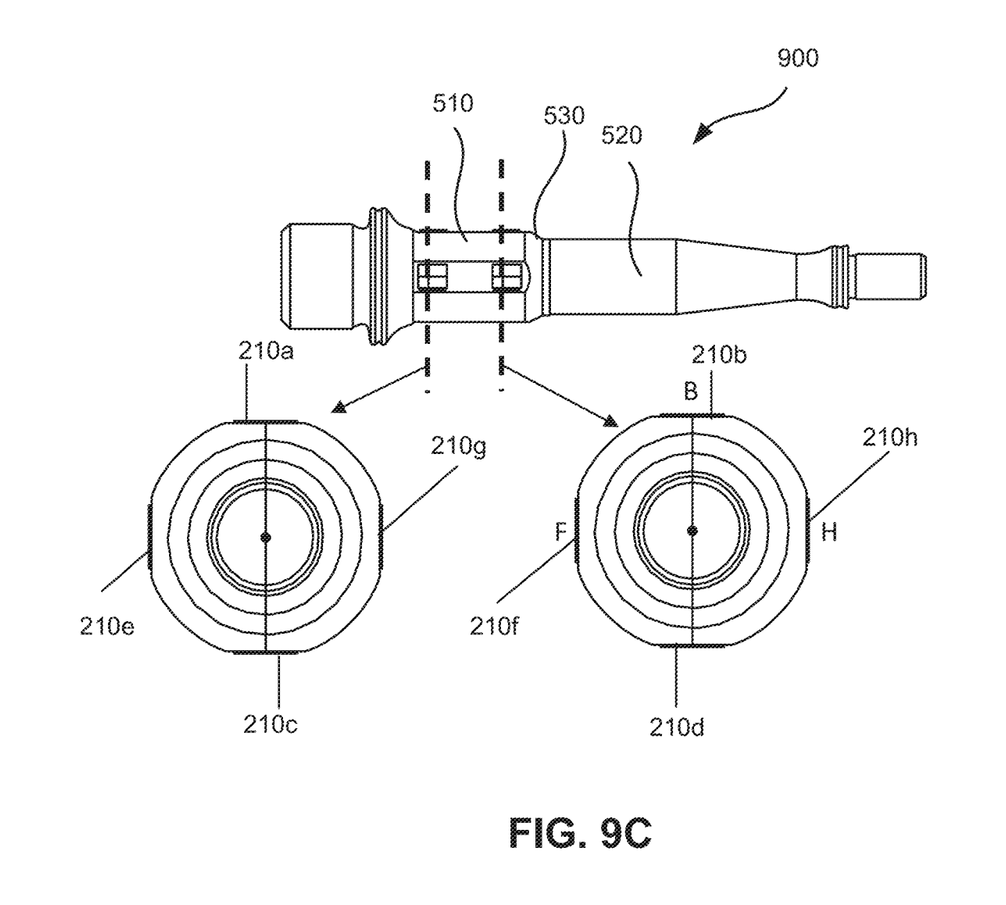

FIGS. 9A-9C illustrate another exemplary power-measuring device 900 consistent with some embodiments of the present disclosure. In the embodiments of FIGS. 9A-9C, four sections 910 are configured for mounting power gauges. Specifically, eight power gauges 210a-210h are placed on the four sections 910. As shown in FIG. 9A, the four sections 910 are equally spaced apart from one another around the first section 510. In other words, the angle between the center axes of two adjacent sections 910 is equal to or about 90 degrees. The hole 414 is provided on the first section 510 near an end adjacent to the transition section 530 and equally spaced between the two adjacent sections 910. In other words, the angle between the axis of the hole 414 and the center axis of the adjacent section 910 is equal to or about 45 degrees.

As shown in FIG. 9B and FIG. 9C, each section 910 is associated with a pair of power gauges (e.g., a first pair including power gauges 210a and 210b, a second pair including power gauges 210c and 210d, a third pair including power gauges 210e and 210f, a fourth pair including power gauges 210g and 210h). Power gauges 210b, 210d, 210f, 210h are adjacent to the transition section 530, while power gauges 210a, 210c, 210e, 210g are away from the transition section 530. During the pedaling, the sensing signals detected by power gauges 210b, 210d, 210f, 210h adjacent to the transition section 530 may be more imbalanced compared to the sensing signals detected by power gauges 210a, 210c, 210e, 210g due to the hole 414.

Figure 10:
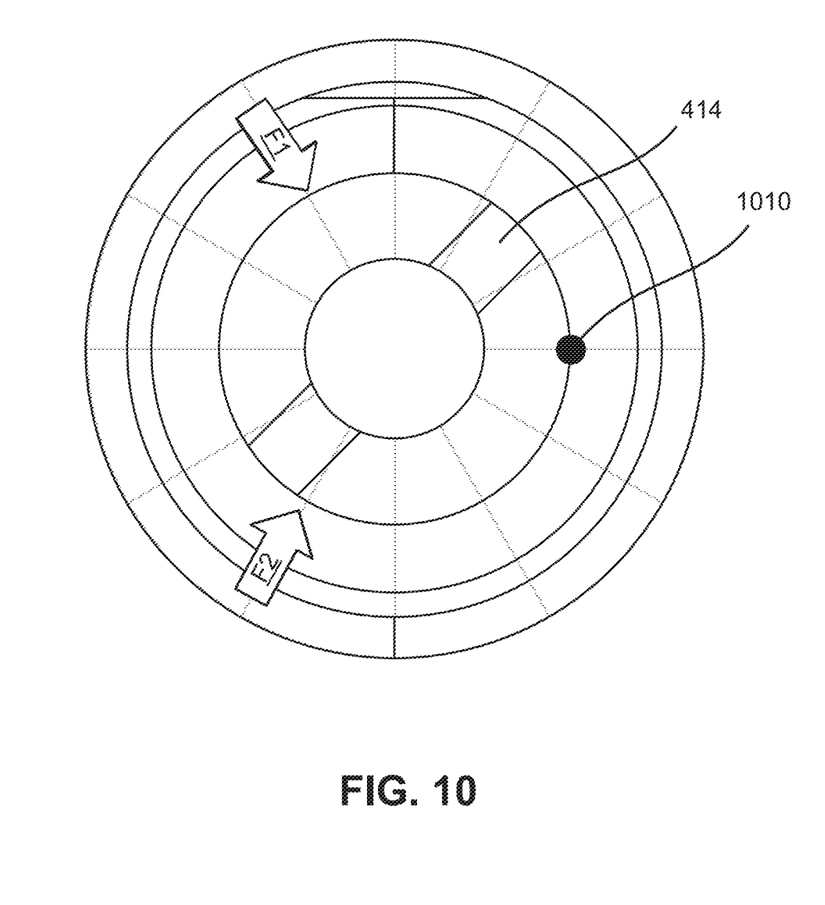
FIG. 10 is a diagram illustrating an imbalanced detection result, consistent with some embodiments of the present disclosure.

FIG. 10 is a diagram illustrating an imbalanced detection result caused by the hole 414, consistent with some embodiments of the present disclosure. As shown in FIG. 10, for the same detecting point 1010 (e.g., a detecting point corresponding to the power gauge 210h), two forces F1 and F2 with the same value and equally distanced from the detecting point 1010 may result different detection results, because the force F2 is applied adjacent to the hollow hole 414 and on the same side with the detecting point 1010, while the force F1 is applied away from the hollow hole 414, and the hole 414 separates the detecting point 1010 from the force F1. As a result, the sensing signals detected may be imbalanced due to the hole 414, which causes an undesired error and leads to potential malfunction.

Figure 11A:
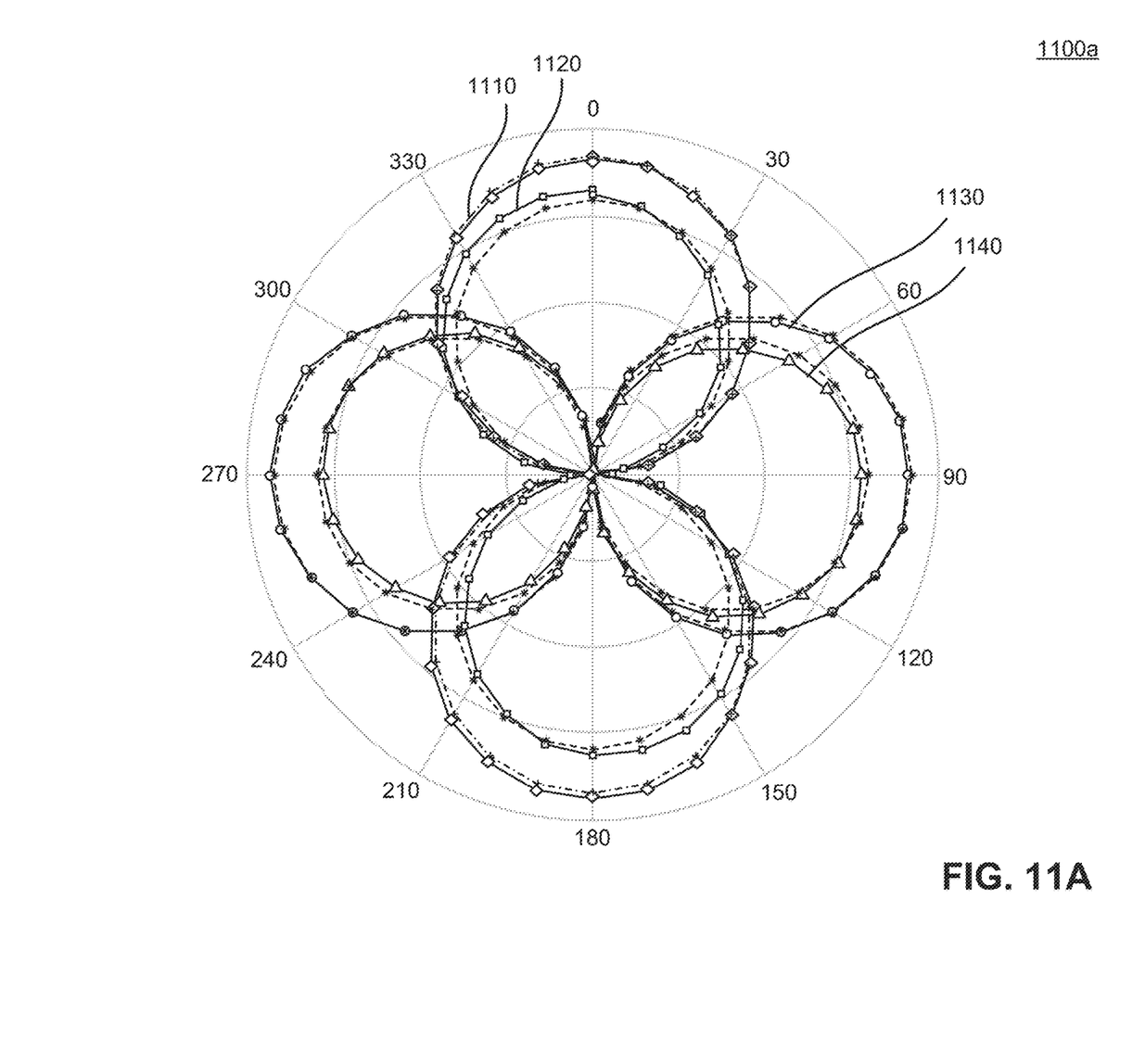
FIGS. 11A and 11B are charts respectively illustrating detection results obtained from different power-measuring devices, consistent with some embodiments of the present disclosure.

FIG. 11A is a chart 1100a illustrating detection results obtained from a power-measuring device with a relatively large diameter of the hole, consistent with some embodiments of the present disclosure. As shown in FIG. 11A, curves 1110, 1120, 1130, and 1140 respectively represent the sensitivities detected by power gauges 210a-210h. In particular, the curve 1110 represents the sensitivity detected by subtracting the signal detected by power gauge 210c from the signal detected by power gauge 210a. Similarly, the curve 1120 represents the sensitivity detected by subtracting the signal detected by power gauge 210d from the signal detected by power gauge 210b. The curve 1130 represents the sensitivity detected by subtracting the signal detected by power gauge 210g from the signal detected by power gauge 210e. The curve 1140 represents the sensitivity detected by subtracting the signal detected by power gauge 210h from the signal detected by power gauge 210f. Each sample point represents the value of the sensitivity detected when the force is applied at a specific angle. Each of curves 1110, 1120, 1130, and 1140 includes 36 sample points associated with the detections performed every 10 degrees. In FIG. 11A, the imbalanced errors exist between curves 1110-1140 and the ideally symmetric results denoted by the dotted lines. In addition, the imbalanced errors shown in the curves 1120 and 1140 corresponding to the power gauges 210b, 210d, 210f, and 210h closer to the hole 414 are greater than the imbalanced errors shown in the curves 1110 and 1130.

Figure 11B:
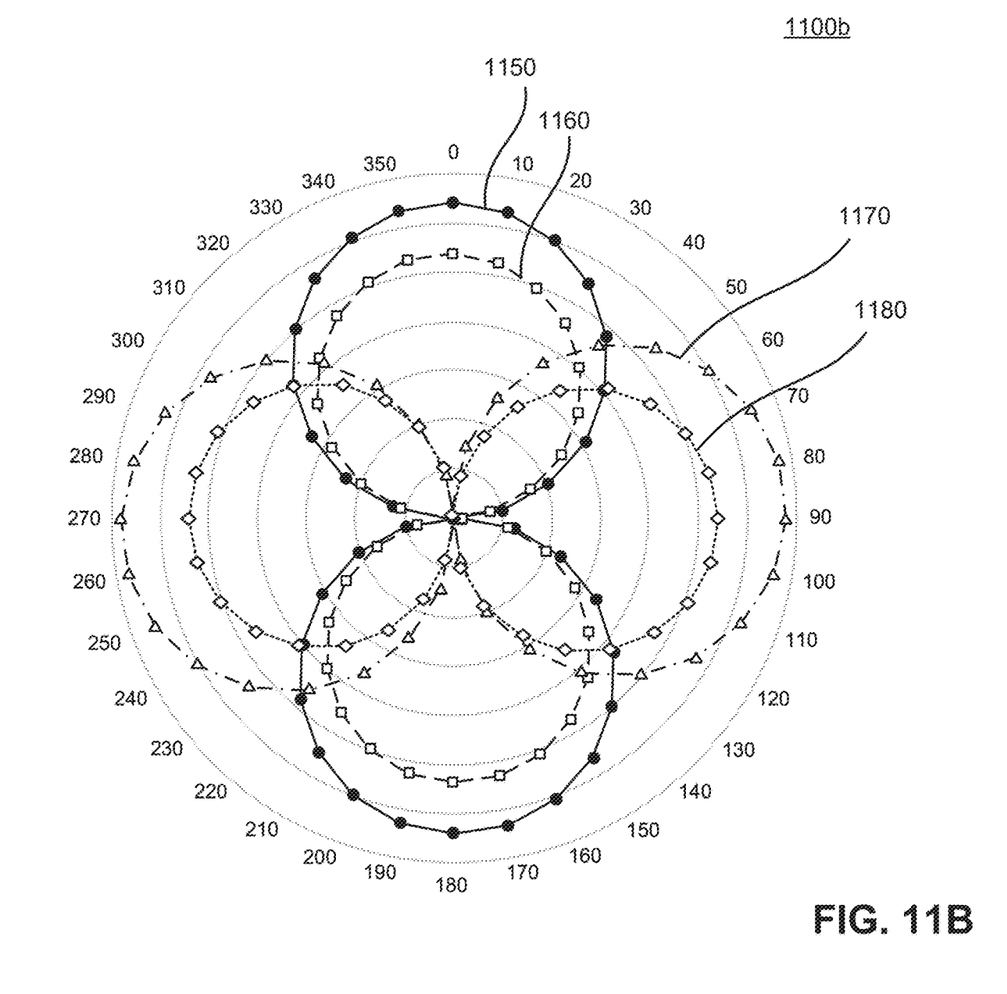

By properly selecting the diameter 660 of the hole 414, the imbalanced errors can be reduced. In particular, when the diameter 660 is reduced, the errors can be reduced accordingly as the hole 414 causes less impact on the detection performed by power gauges 210a-210h. FIG. 11B is another chart 1100b illustrating detection results obtained from a power-measuring device with a relatively small diameter of the hole, consistent with some embodiments of the present disclosure. Similar to FIG. 11A, in FIG. 11B, curves 1150, 1160, 1170, and 1180 respectively represent the sensitivities detected by power gauges 210a-210h. In particular, the curve 1150 represents the sensitivity detected by subtracting the signal detected by power gauge 210c from the signal detected by power gauge 210a. Similarly, the curve 1160 represents the sensitivity detected by subtracting the signal detected by power gauge 210d from the signal detected by power gauge 210b. The curve 1170 represents the sensitivity detected by subtracting the signal detected by power gauge 210g from the signal detected by power gauge 210e. The curve 1180 represents the sensitivity detected by subtracting the signal detected by power gauge 210h from the signal detected by power gauge 210f. Compared to FIG. 11A, the imbalanced errors shown in curves 1150-1180 of FIG. 11B are less than the imbalanced errors shown in curves 1110-1140 of FIG. 11A due to the relatively small diameter (e.g., 1.2 mm) of the hole 414. As discussed above, in various embodiments, the diameter 660 of the hole 414 through the spindle wall in the spindle 410 may be selected to meet the actual design needs. For example, the diameter 660 may be between approximately 0.6 and 3 millimeters.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The drawings and specification illustrate exemplary embodiments. It will be apparent to those skilled in the art that various modifications and variations can be made to the disclosed systems and related methods. Other embodiments will be apparent to those skilled in the art from considering the specification and applying the disclosed system and related methods. It is intended that the specification and examples are exemplary only, and the following claims and their equivalents identify certain examples consistent with the disclosure.

What is claimed is:

1. A power-measuring device comprising:
   a spindle including a first section having a first outer diameter, and a second section having a second outer diameter, the spindle including a battery chamber within a hollow space of the spindle, the battery chamber being configured to receive a battery unit;
   a plurality of power gauges coupled with the spindle to measure power applied to the spindle;
   an electrical circuit coupled with the spindle, the electrical circuit being electrically coupled with the power gauges, being electrically coupled with the battery unit, and being configured to receive and process signals from the power gauges; and
   a cover coupled with the spindle and being arranged to enclose at least a portion of at least one of the power gauges and the electrical circuit,
   wherein a hole is provided on the spindle in the first section, and the hole is approximately equally spaced between two adjacent sections for mounting the power gauges in the first section.

2. The power-measuring device of claim 1, wherein the power applied to the spindle are transferred from an exerted force by a rider during pedaling, to drive a bicycle through pedaling of bicycle crank arms that are configured to receive the power from the rider.

3. The power-measuring device of claim 1, wherein the second outer diameter is smaller than the first outer diameter.

4. The power-measuring device of claim 3, wherein the battery chamber extends through at least a portion of the first section and at least a portion of the second section, the first and the second sections having similar inner diameters for providing the hollow space for the battery chamber within the spindle.

5. The power-measuring device of claim 3, wherein the power gauges are mounted on or near the first section of the spindle, and the cover is arranged to cover at least an area of the first section.

6. The power-measuring device of claim 3, further comprising one or more bearings arranged on the second section.

7. The power-measuring device of claim 3, wherein a transition section couples between the first and the second sections of the spindle.

8. The power-measuring device of claim 7, wherein a length of the transition section along a longitudinal axis of the spindle is between approximately 1 and 6 millimeters.

9. The power-measuring device of claim 3, wherein a hole is provided on the spindle in the first section.

10. The power-measuring device of claim 3, wherein the first outer diameter of the first section of the spindle is between approximately 11 and 15 millimeters.

11. The power-measuring device of claim 3, wherein the second outer diameter of the second section of the spindle is between approximately 10 and 13 millimeters.

12. The power-measuring device of claim 3, wherein a thickness of a spindle wall surrounding the battery chamber is between approximately 2 and 4 millimeters.

13. The power-measuring device of claim 1, wherein the battery unit is electrically coupled to the electrical circuit via a set of wires that pass through a hole provided on the spindle.

14. The power-measuring device of claim 1, wherein the battery unit includes a plurality of batteries connected in series or in parallel.

15. The power-measuring device of claim 1, wherein a length of the battery chamber within the spindle is between approximately 50 and 80 millimeters.

16. The power-measuring device of claim 1, wherein a diameter of the hole through a spindle wall in the spindle is between approximately 0.6 and 3 millimeters.

17. The power-measuring device of claim 1, wherein a diameter of the battery chamber is between approximately 4.5 and 9 millimeters.

18. The power-measuring device of claim 1, wherein the electrical circuit includes a printed circuit board or a flexible printed circuit enclosed in a protective material.

19. A bicycle comprising:
crank arms configured to receive power from a rider; and
a power-measuring device comprising:
 a spindle including a first section having a first outer diameter, a second section having a second outer diameter smaller than the first outer diameter, and a transition section between the first section and the second section, the spindle including a battery chamber within a hollow space of the spindle, the battery chamber being configured to receive a battery unit;
 a plurality of power gauges coupled with the spindle to measure power applied to the spindle;
 an electrical circuit coupled with the spindle, the electrical circuit being electrically coupled with the power gauges, being electrically coupled with the battery unit, and being configured to receive and process signals from the power gauges; and
 a cover coupled with the spindle and being arranged to enclose at least a portion of at least one of the power gauges and the electrical circuit,
 wherein a hole is provided on the spindle in the first section, and the hole is approximately equally spaced between two adjacent sections for mounting the power gauges in the first section.

20. A spindle comprising:
a first section having a first outer diameter;
a second section having a second outer diameter, the second outer diameter being smaller than the first outer diameter;
a transition section coupled between the first section and the second section; and
a battery chamber within a hollow space of the spindle, the battery chamber being configured to receive a battery unit, wherein the battery chamber extends through at least a portion of the first section and at least a portion of the second section, the first section and the second section having similar inner diameters for providing the hollow space for the battery chamber within the spindle;
wherein a hole is provided on the spindle in the first section, and the hole is approximately equally spaced between two adjacent sections for mounting power gauges in the first section.

* * * * *